(12) United States Patent
Lixin

(10) Patent No.: US 12,446,734 B2
(45) Date of Patent: Oct. 21, 2025

(54) BOX LID AND AIRTIGHT BOX

(71) Applicant: NINGBO LISI HOUSEWARE CO, LTD., Ningbo (CN)

(72) Inventor: Li Lixin, Ningbo (CN)

(73) Assignee: NINGBO LISI HOUSEWARE CO., LTD., Ningbo (CN)

(*) Notice: Subject to any disclaimer, the term of this patent is extended or adjusted under 35 U.S.C. 154(b) by 9 days.

(21) Appl. No.: 18/436,726

(22) Filed: Feb. 8, 2024

(65) Prior Publication Data
US 2025/0228410 A1 Jul. 17, 2025

(51) Int. Cl.
B65D 43/02 (2006.01)
A47J 47/02 (2006.01)

(52) U.S. Cl.
CPC .................................. A47J 47/02 (2013.01)

(58) Field of Classification Search
CPC .. B65D 2543/0049; B65D 2543/00972; B65D 2543/00537; B65D 2543/00296; B65D 2543/00092; B65D 2543/00564; B65D 53/02; A45C 11/20; A47J 47/02

USPC ................................ 220/378, 319, 795, 320
See application file for complete search history.

(56) References Cited

U.S. PATENT DOCUMENTS

| | | | | |
|---|---|---|---|---|
| 2018/0265267 A1* | 9/2018 | Arenas | .................... | B65D 45/00 |
| 2019/0119011 A1* | 4/2019 | Naomi | .................... | B65D 53/02 |
| 2019/0337684 A1* | 11/2019 | Gröner | .................... | B65D 43/02 |

* cited by examiner

Primary Examiner — King M Chu
(74) Attorney, Agent, or Firm — Andrew C. Cheng

(57) ABSTRACT

This disclosure provides a box lid and an airtight box and belongs to the technical field of food preservation boxes. The box lid comprises: a lid body; and a sealing ring connected to the lid body, the sealing ring comprising an inclined portion inclined inwards, wherein the inclined portion can produce elastic deformation and is deformable to a sealing state. The beneficial effects of this disclosure are as follows: The specially designed sealing ring allows the airtight box to maintain an airtight effect when the interior is in a positive pressure environment, so the airtight box does not need air release after being sealed. When the box lid reaches the sealing position from the contact position, the air pressure in the box increases to assist the inclined portion of the sealing ring to achieve sealing.

5 Claims, 5 Drawing Sheets

BOX LID AND AIRTIGHT BOX

This patent claims priority to Chinese Patent Application No. ZL202410021632.X, filed on Jan. 11, 2024, which is hereby incorporated by reference in its entirety for all purposes.

BACKGROUND OF THE INVENTION

1. Technical Field

This disclosure belongs to the technical field of food preservation boxes and relates to a box lid and an airtight box.

2. Description of Related Art

Airtight boxes (food preservation boxes or lunch boxes) are common daily necessities. Many students, working people, and people who go out carry their meals in a lunch box. Airtightness is one of the important properties of the airtight boxes.

For example, a utility model patent application CN201310461219.7 discloses a thermal lunch box, which forms an airtight structure by virtue of a sealing ring on the lid and a box body. When a lunch box contains hot food or the food in the box is heated, the air pressure in the lunch box will be higher than the outside air pressure. The lid needs a large pressure to press the sealing ring tightly to maintain the airtight effect, or air in the lunch box needs to be released to balance the pressure difference between the inside and outside. However, it is difficult for the sealing ring of the existing airtight box to maintain the airtight effect when the interior of the box body is in a positive pressure environment, so there is room for improvement.

BRIEF SUMMARY OF THE INVENTION

Directed to the above problems existing in the prior art, an objective of this disclosure is to provides a box lid and an airtight box.

The objective of this disclosure can be achieved through the following technical solutions: a box lid, including:

a lid body; and
a sealing ring connected to the lid body, the sealing ring including an inclined portion inclined inwards, wherein the inclined portion can produce elastic deformation and is deformable to a sealing state;
when the inclined portion is in the sealing state, there is a gap between an upper surface of the inclined portion and a lower surface of the lid body, and a lower surface of the inclined portion is at an angle that can fit a surface to be sealed.

Preferably, when the gap is in a positive pressure environment, the inclined portion is pressed by a pressure toward the surface to be fitted.

Preferably, the gap is shaped as an acute angle.

Preferably, the inclined portion has an annular tapered structure, a tail end of the inclined portion is an annular resistance end, and an inner edge surface of the annular resistance end has an arc structure.

Preferably, the cross section of the inclined portion is tapered.

Preferably, the sealing ring further includes a base portion, the base portion is connected to the lid body, and the inclined portion is integrally connected to the base portion.

Preferably, the lower surface of the lid body is provided with a locking groove, and the base portion is interference-fitted with the locking groove.

Preferably, the lid body is provided with two fastening lugs, and the two fastening lugs are respectively located on two sides of the lid body.

An airtight box, including the box lid and further including a box body, the top of the box body having a surface to be sealed;

wherein the lid body of the box lid is in a contact position or a sealing position relative to the box body; when the lid body reaches the contact position, the tail end of the inclined portion of the sealing ring comes in contact with the surface to be sealed and seals the box body; when the lid body reaches the sealing position, the inclined portion is in a sealing state, and the lower surface of the inclined portion fits the surface to be sealed.

Preferably, when the lid body reaches the sealing position from the contact position, the air pressure in the box body increases and forms a positive pressure environment so that the gap is in a positive pressure environment.

Compared with the prior art, this disclosure has the following beneficial effects:

1. The specially designed sealing ring allows the airtight box to maintain an airtight effect when the interior is in a positive pressure environment, so the airtight box does not need air release after being sealed. When the box lid reaches the sealing position from the contact position, the air pressure in the box increases to assist the inclined portion of the sealing ring to achieve sealing.

2. When the interior of the box body is in a positive pressure environment, the air pressure inside the box body is higher than the air pressure outside the box body. When the box body is sealed by the box lid, a positive pressure environment can be formed inside the box body. When hot food is placed in the box body and the box lid is put on, the air in the box body expands and strengthens the positive pressure environment (i.e., increases the air pressure in the box body). In the above case, the sealing ring can achieve excellent sealing effect through the positive pressure environment by virtue of the inclined portion.

3. When the inclined portion is in the sealing state, the lower surface of the inclined portion basically fits the surface to be sealed, while the upper surface of the inclined portion is at an inclined angle (that is, inclined to the surface to be sealed or the lower surface of the box body), and when the air pressure in the gap acts on the upper surface of the inclined portion, it can better exert pressure on the inclined portion.

4. The inner edge surface of the annular resistance end has an arc structure, so it can better contact and fit the surface to be sealed. When the lid body is in the contact position, the interior of the box body can be sealed through the inner edge surface of the annular resistance end.

5. In the process of the lid body of the box lid reaching the sealing position from the contact position (i.e., the process of the lid body changing from sealing to snapping with the box body), the volume in the box body changes slightly, and the pressure difference between the inside and outside is also small (that is, the positive pressure in the box body is small), so the box lid only needs a small snapping force to achieve the airtight effect of the airtight box. In this embodiment, only two fastening lugs are needed to achieve sealing.

In the figures, 100. lid body; 110. gap; 120. locking groove; 130. fastening lug; 200. sealing ring; 210. inclined portion; 211. annular resistance end; 220. base portion; 300. box body; 310. surface to be sealed.

DETAILED DESCRIPTION OF THE INVENTION

The following are specific embodiments of this disclosure and further describe the technical solutions of this disclosure in conjunction with the accompanying drawings, but this disclosure is not limited to these embodiments.

Figure 1:
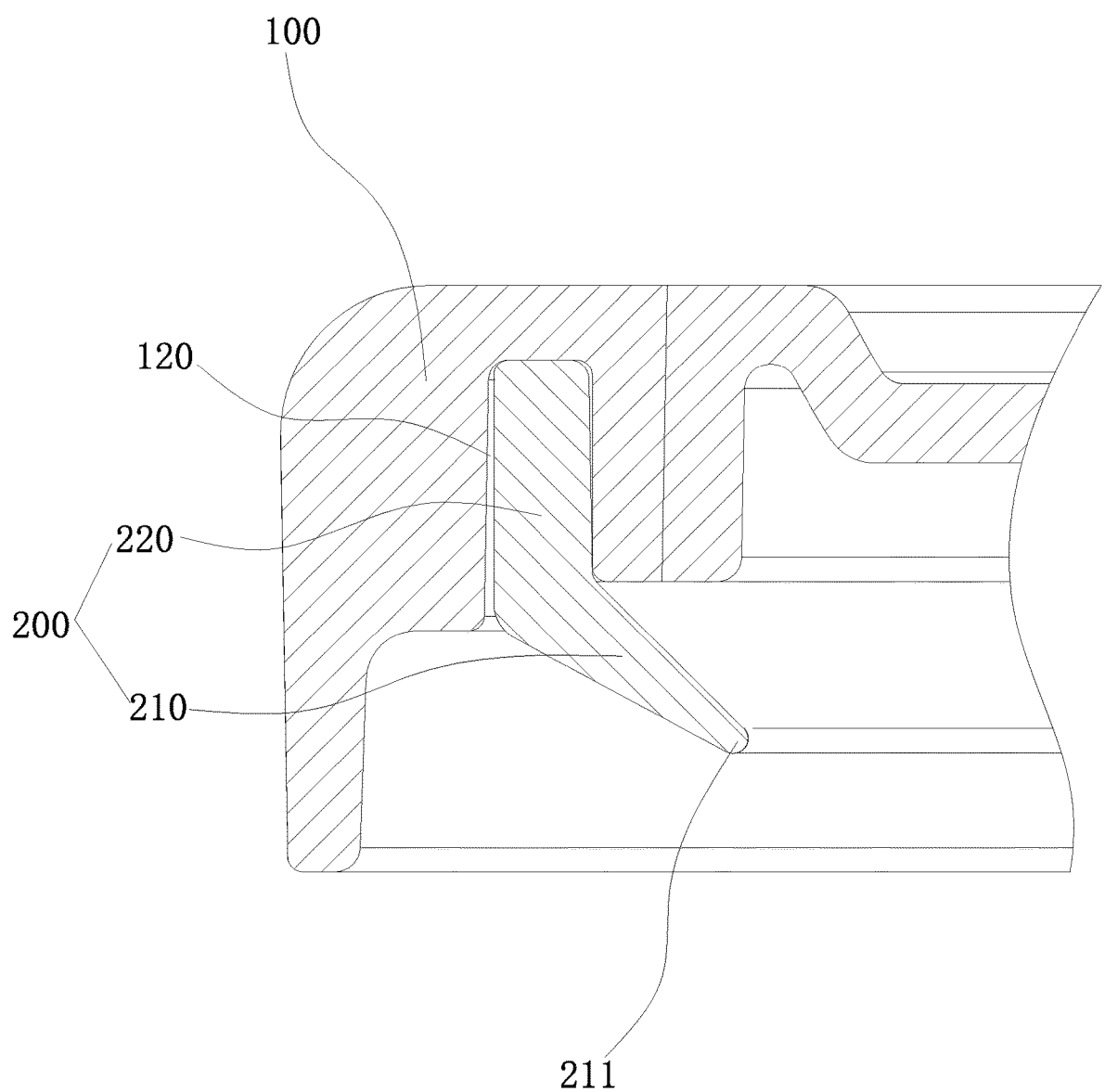
FIG. 1 is a partially schematic structural diagram of a box lid according to this disclosure.
Figure 2:
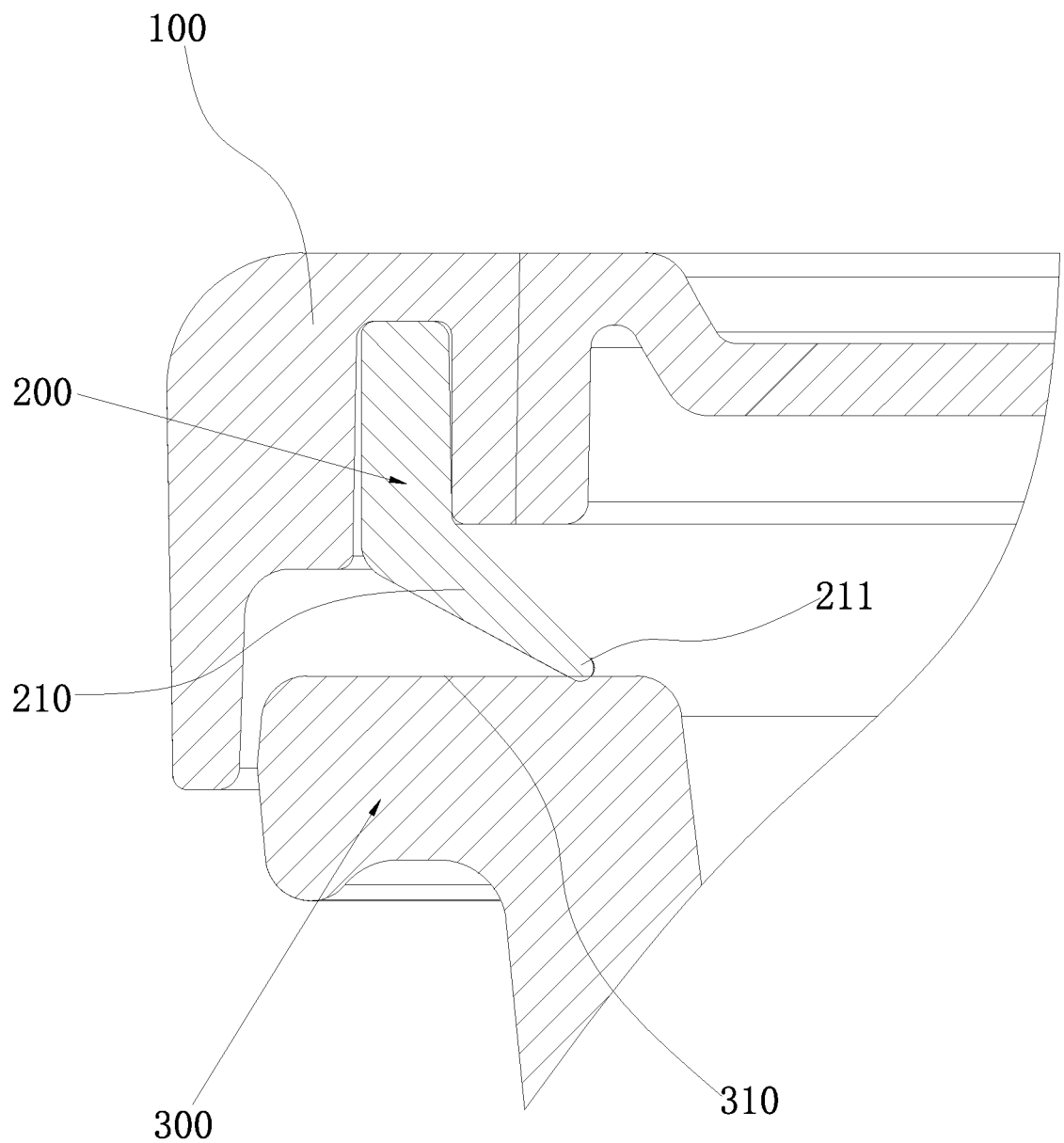
FIG. 2 is a partially schematic structural diagram of a lid body according to this disclosure in a contact position.
Figure 3:
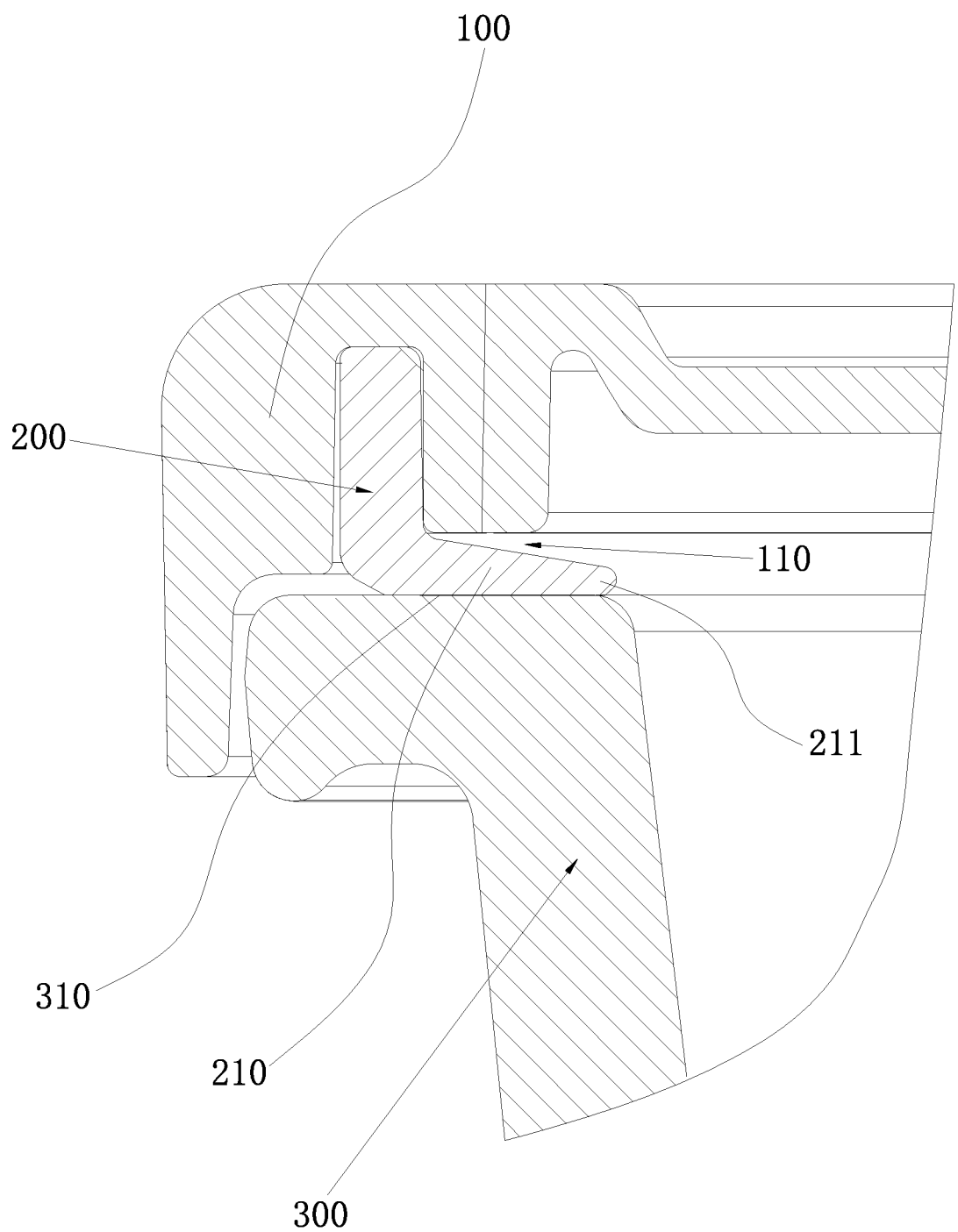
FIG. 3 is a partially schematic structural diagram of a lid body according to this disclosure in a sealing position.
Figure 4:
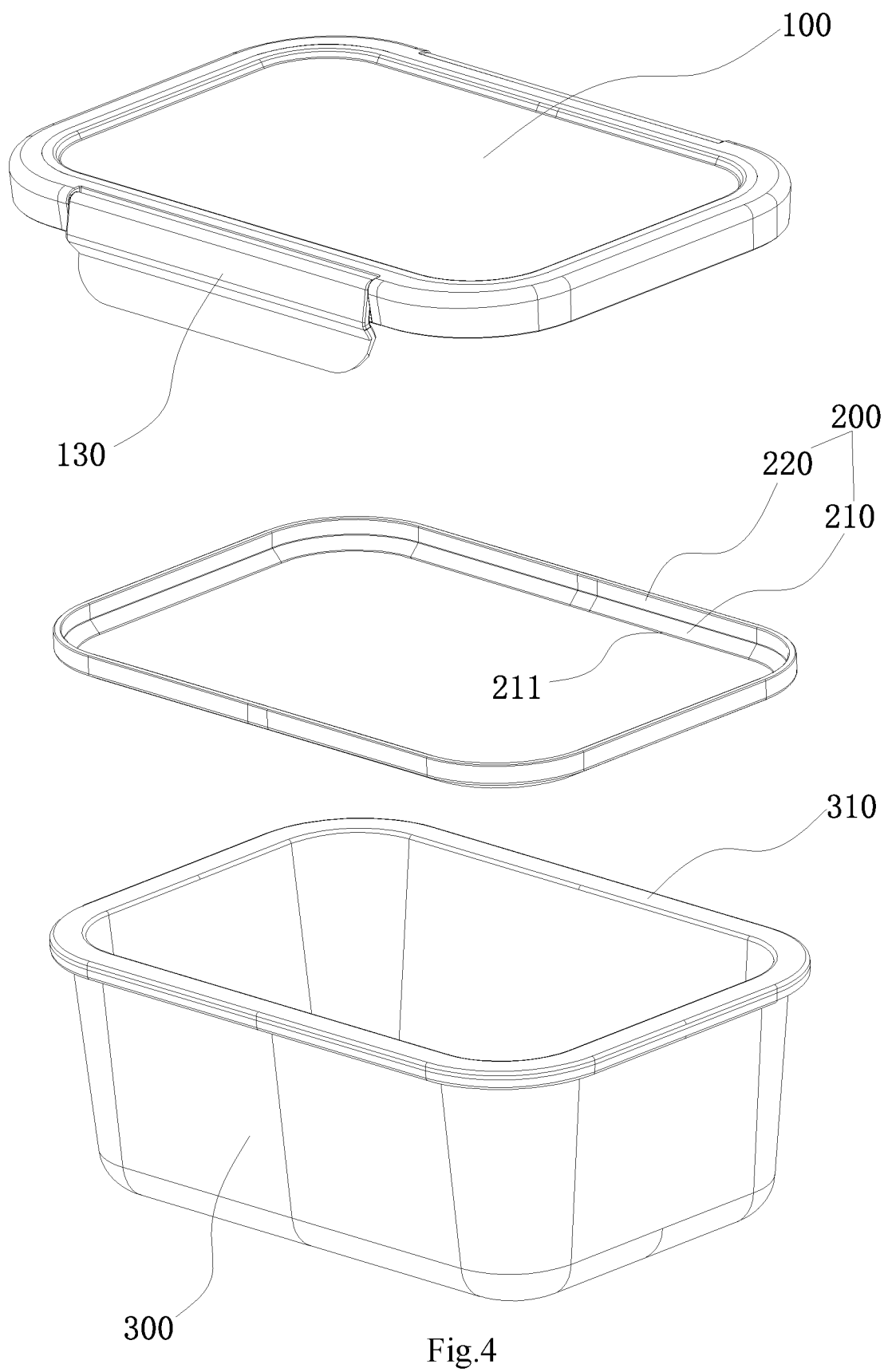
FIG. 4 is an exploded structural diagram of an airtight box according to this disclosure.
Figure 5:
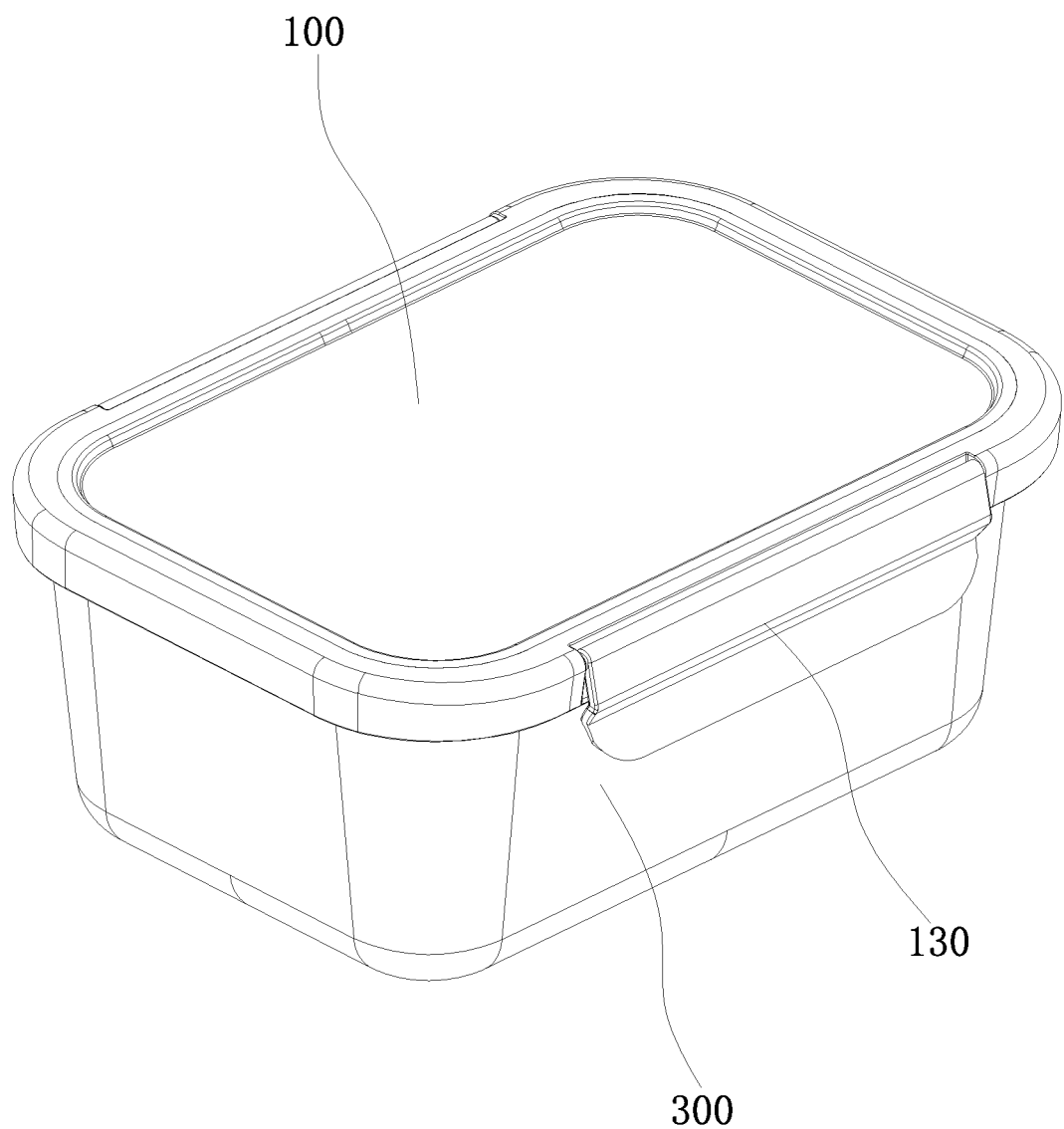
FIG. 5 is a schematic structural diagram of the airtight box according to this disclosure.

As shown in FIGS. 1-3, a box lid includes a lid body 100 and a sealing ring 200 connected to the lid body 100, and the sealing ring 200 includes an inclined portion 210 inclined inwards. The inclined portion 210 can produce elastic deformation and is deformable to a sealing state. When the inclined portion 210 is in the sealing state, there is a gap 110 between an upper surface of the inclined portion 210 and a lower surface of the lid body 100, and a lower surface of the inclined portion 210 is at an angle that can fit a surface 310 to be sealed.

The sealing ring 200 is connected to the edge of the lower surface of the lid body 100. The inclined portion 210 is the portion of the sealing ring 200 that extends out of the lower surface of the lid body 100. It should be added that the inclined portion 210 has an annular tapered structure. That is, an annular portion of the sealing ring 200 that extends out of the lower surface of the lid body 100 is inclined inwards to form the inclined portion 210 similar to a tapered structure. When the lower surface of the inclined portion 210 is in a horizontal state (that is, the lower surface of the inclined portion 210 is at an angle that fits the surface 310 to be sealed), the gap 110 is reserved between the upper surface of the inclined portion 210 and the lower surface of the lid body 100.

Generally, when the interior of the airtight box is in a negative pressure environment, the external atmospheric pressure can exert pressure on the box lid so that the box lid seals the box body 300. Therefore, when the interior of the airtight box is in a negative pressure environment, the sealing performance can basically be guaranteed. However, when the existing airtight box is in a positive pressure environment, the pressure inside the box will push open the box lid, thereby weakening the sealing performance of the airtight box. Generally, in this case, the sealing box needs air release to balance the pressure difference, so it is very troublesome and the actual effect is not ideal.

In use of the box lid: when the sealing ring 200 of the lid body 100 first comes into contact with the box body 300, the box body 300 is in the contact position, and the tail end (i.e., the annular resistance end 211) of the inclined portion 210 contacts the surface 310 to be sealed at the top of the box body 300 to seal the space inside the box body 300, and then the lid body 100 is pressed down and reaches the sealing position. During this process, the volume in the box body 300 decreases and the air pressure increases (because the box body 300 is sealed, the total amount of gas remains unchanged). When the lid body 100 reaches the sealing position, the inclined portion 210 of the sealing ring 200 is in a sealing state, the lower surface of the inclined portion 210 fits the surface 310 to be sealed of the box body 300 and increases the sealing area, and there is a gap 110 between the upper surface of the inclined portion 210 and the lower surface of the lid body 100. In this case, the air pressure in the box body 300 acts in the gap 110, and the air pressure presses the upper surface of the inclined portion 210 downward (at this moment, the upper surface of the inclined portion 210 is at an inclined angle), so that the lower surface of the inclined portion 210 is firmly pressed on the surface 310 to be sealed of the box body 300 and then the sealing ring 200 can better seal the space inside the box body 300.

The specially designed sealing ring 200 allows the airtight box to maintain an airtight effect when the interior is in a positive pressure environment, so the airtight box does not need air release after being sealed. When the box lid reaches the sealing position from the contact position, the air pressure in the box increases to assist the inclined portion 210 of the sealing ring 200 to achieve sealing.

It should be added that when the lid body 100 is in the contact position, there is an included angle between the lower surface of the inclined portion 210 and the surface 310 to be sealed (that is, only the tail end of the inclined portion 210 is in contact with the surface 310 to be sealed). When the lid body 100 reaches the sealing position from the contact position, the tail end (the annular resisting end 211) of the inclined portion 210 is resisted by the surface 310 to be sealed, thereby causing the inclined portion 210 to elastically deform. When the inclined portion 210 is deformed, it moves towards the lower surface of the lid body 100. At this moment, the lower surface of the inclined portion 210 gradually approaches the angle fitting the surface 310 to be sealed. In an example, the lower surface of the inclined portion 210 gradually becomes horizontal, and the upper surface of the inclined portion 210 gradually approaches the lower surface of the lid body 100. When the inclined portion 210 is in the sealing state, the lower surface of the inclined portion 210 basically fits the surface 310 to be sealed, while the upper surface of the inclined portion 210 is at an inclined angle (that is, inclined to the surface 310 to be sealed or the lower surface of the box body 300), and when the air pressure in the gap 110 acts on the upper surface of the inclined portion 210, it can better exert pressure on the inclined portion 210.

Based on the above embodiment, when the gap 110 is in a positive pressure environment, the inclined portion 210 is pressed by a pressure toward the surface to be fitted.

It should be noted here that when the interior of the box body 300 is in a positive pressure environment, the air pressure inside the box body 300 is higher than the air pressure outside the box body 300, and when the box body 300 is sealed by the box lid, a positive pressure environment can be formed inside the box body 300; in addition, when hot food is placed in the box body 300 and the box lid is put on, the air in the box body 300 expands and strengthens the positive pressure environment (i.e., increases the air pressure in the box body). In the above case, the sealing ring 200 can achieve excellent sealing effect through the positive pressure environment by virtue of the inclined portion 210.

As shown in FIG. 3, based on the above embodiments, the gap 110 is shaped as an acute angle. In an example, the cross section of the gap 110 is in the shape of "<", that is, the gap 110 is an annular cavity structure shaped like an included angle. The opening of the gap 110 can be connected with the interior of the box body 300. When the gap 110 is in a positive pressure environment, the air pressure acts on the inclined upper surface of the inclined portion 210, thereby better pressing the inclined portion 210.

As shown in FIGS. 1-3, based on the above embodiments, the inclined portion 210 has an annular tapered structure, the tail end of the inclined portion 210 is an annular resistance end 211, and the inner edge surface of the annular resistance end 211 has an arc structure. The inner edge surface of the annular resistance end 211 has an arc structure, so it can better contact and fit the surface 310 to be sealed. When the lid body 100 is in the contact position, the interior of the box body 300 can be sealed through the inner edge surface of the annular resistance end 211.

As shown in FIGS. 1-3, based on the above embodiments, the cross section of the inclined portion 210 is tapered. When the lower surface of the inclined portion 210 is in contact with the surface 310 to be sealed, the upper surface of the inclined portion 210 can be at an inclined angle, thereby leaving a gap 110 shaped like an included angle between the upper surface of the inclined portion 210 and the lower surface of the lid body 100.

As shown in FIG. 1, based on the above embodiments, the sealing ring 200 further includes a base portion 220, the base portion 220 is connected to the lid body 100, and the inclined portion 210 is integrally connected to the base portion 220. Preferably, the lower surface of the lid body 100 is provided with a locking groove 120, and the base portion 220 is interference-fitted with the locking groove 120.

As shown in FIGS. 1-5, based on the above embodiments, the lid body 100 is provided with two fastening lugs 130, and the two fastening lugs 130 are respectively located on two sides of the lid body 100.

In the process of the lid body 100 of the box lid reaching the sealing position from the contact position (i.e., the process of the lid body 100 changing from sealing to snapping with the box body 300), the volume in the box body 300 changes slightly, and the pressure difference between the inside and outside is also small (that is, the positive pressure in the box body 300 is small), so the box lid only needs a small snapping force to achieve the airtight effect of the airtight box. In this embodiment, only two fastening lugs 130 are needed to achieve sealing.

As shown in FIGS. 1-5, an airtight box includes a box lid and further includes a box body 300, the top of the box body 300 has a surface 310 to be sealed; the lid body 100 of the box lid may be in a contact position or a sealing position relative to the box body 300; when the lid body 100 reaches the contact position, the tail end of the inclined portion 210 of the sealing ring 200 comes in contact with the surface 310 to be sealed and seals the box body 300; when the lid body 100 reaches the sealing position, the inclined portion 210 is in a sealing state, and the lower surface of the inclined portion 210 fits the surface 310 to be sealed.

The contact position of the lid body 100 is the position where the lid body 100 first comes into contact with the box body 300, and it can also be understood as the position of the lid body 100 when the annular resistance end 211 of the inclined portion 210 contacts the surface 310 to be sealed. The sealing position of the lid body 100 is the position of the lid body 100 when the sealing ring 200 is in the sealing state. When the lid body 100 is in the sealing position, it can snap with the box body 300 by virtue of the fastening lugs 130.

When the lid body 100 is in the contact position, the annular resistance end 211 of the inclined portion 210 seals the surface 310 to be sealed. When the lid body 100 is pressed down and reaches the sealing position from the contact position, the sealing ring 200 is in a sealing state. At this moment, the lower surface of the inclined portion 210 fits the surface to be sealed 310 to improve the sealing effect. In the meanwhile, the sealing volume in the box body 300 decreases and the air pressure increases, so that the interior of the box 300 is in a positive pressure environment. The air pressure in the gap 110 acts on the upper surface of the inclined portion 210 and causes the lower surface of the inclined portion 210 to tightly press the surface 310 to be sealed. When the lid body 100 is in the sealing position, it can snap with the box body 300 through the two fastening lugs 130, thereby achieving a better sealing effect in a positive pressure environment. Moreover, there is no need to release the air from the airtight box and the sealing can be achieved just using two fastening lugs 130, which is very convenient.

As shown in FIGS. 1-3, based on the above embodiments, when the lid body 100 reaches the sealing position from the contact position, the air pressure in the box body 300 increases and forms a positive pressure environment so that the gap 110 is in a positive pressure environment.

In addition, when hot food is placed in the box body 300, the air in the box 300 expands to form a positive pressure environment in the box body 300.

It should be noted that all directional indications (such as up, down, left, right, front, back etc.) in the embodiments of this disclosure are only used to explain a relative positional relationship, motion, etc. between the various components in a specific attitude (as shown in the accompanying drawings). If the specific attitude changes, the directional indications will also change accordingly.

In addition, descriptions referring to, such as, "first", "second", "one", etc. in this disclosure are only used for descriptive purposes, and should not be construed as indicating or implying a relative importance or implicitly indicating the number of technical features indicated. Thus, features defined by the term "first" or "second" may include at least one of the features, either explicitly or implicitly. In the description of this disclosure, "a plurality of" means at least two, such as two, three, etc., unless otherwise expressly and specifically defined.

In this disclosure, unless otherwise expressly specified and defined, the terms "connected", "fixed" and the like should be understood in a broad sense. For example, the connection may be either a fixed connection or a detachable connection, or in one piece; it may be a mechanical connection, or it may be an electrical connection; it may be a direct connection or indirect connection through an intermediate medium, and may be an internal communication of two components or an interaction relationship between two components, unless otherwise expressly defined. For those skilled in the art, the specific meanings of the above terms in this disclosure could be understood according to the specific conditions.

In addition, the technical solutions of the various embodiments of this disclosure can be combined with each other, but must be based on the implementation by those of ordinary skill in the art. When the combination of technical solutions contradicts each other or cannot be implemented, it should be considered that such combination of technical solutions does not exist and does not fall within the scope of this disclosure.

The specific embodiments described herein are only examples to illustrate the spirit of this disclosure. Those skilled in the art to which this disclosure belongs can make various modifications or additions to the specific embodiments described or use similar alternatives, without departing from the spirit of this disclosure or going beyond the scope defined in the appended claims.

The invention claimed is:

1. A box lid, comprising:
   a lid body (100); and
   a sealing ring (200) connected to the lid body (100), the sealing ring (200) comprising an inclined portion (210) inclined inwards, wherein the inclined portion (210) can produce elastic deformation and is deformable to a sealing state;
   when the inclined portion (210) is in the sealing state, one end of the inclined portion (210) is in contact with the lid body (100), and the other end is away from the lid body (100); a gap (110) is formed between a portion of the lid body (100) close to and located directly above the inclined portion (210) and the inclined portion (210); the gap (110) is shaped as an acute angle; angle of the gap (110) is constant, and size of the gap gradually decreases from the center of the lid body to its edge; and a lower surface of the inclined portion (210) is at an angle that can fit a surface (310) to be sealed;
   when the gap (110) is in a positive pressure environment, the inclined portion (210) is pressed by a pressure toward the surface to be fitted;
   the inclined portion (210) has an annular tapered structure, a tail end of the inclined portion (210) is an annular resistance end (211), and an inner edge surface of the annular resistance end (211) has an arc structure;
   the cross section of the inclined portion (210) is tapered;
   the lid body (100) is provided with two fastening lugs (130), and the two fastening lugs (130) are respectively located on two sides of the lid body (100).

2. The box lid according to claim 1, wherein the sealing ring (200) further comprises a base portion (220), the base portion (220) is connected to the lid body (100), and the inclined portion (210) is integrally connected to the base portion (220).

3. The box lid according to claim 2, wherein the lower surface of the lid body (100) is provided with a locking groove (120), and the base portion (220) is interference-fitted with the locking groove (120).

4. An airtight box, comprising the box lid according to any one of claim 1 and further comprising a box body (300), the top of the box body (300) having a surface (310) to be sealed;
   wherein the lid body (100) of the box lid is in a contact position or a sealing position relative to the box body (300); when the lid body (100) reaches the contact position, the tail end of the inclined portion (210) of the sealing ring (200) comes in contact with the surface (310) to be sealed and seals the box body (300); when the lid body (100) reaches the sealing position, the inclined portion (210) is in a sealing state, and the lower surface of the inclined portion (210) fits the surface (310) to be sealed.

5. The airtight box according to claim 4, wherein when the lid body (100) reaches the sealing position from the contact position, the air pressure in the box body (300) increases and forms a positive pressure environment so that the gap (110) is in a positive pressure environment.

* * * * *